United States Patent Office 2,879,273
Patented Mar. 24, 1959

2,879,273

PROCESS FOR THE MANUFACTURE OF Δ-3,4-THIAZOLINES

Friedrich Asinger and Max Thiel, Leuna, Germany, assignors to VEB Leuna-Werke "Walter Ulbricht," Leuna, Germany No Drawing. Application October 10, 1956
Serial No. 615,025

Claims priority, application Germany April 14, 1956

11 Claims. (Cl. 260—306.7)

This invention relates to novel thiazolines and a process for their production.

Theoretically, thiazolines may occur in three isomeric forms, dependent on the position of the double bond in the ring system. The synthesis of Δ-2,3 and Δ-5,6-thiazolines has already been described in the chemical literature. However, up to this time little was known with regard to the synthesis of the third isomeric form, i.e. Δ-3,4-thiazolines.

It is an object of this invention to provide Δ-3,4-thiazolines.

A further object of this invention is the provision of a process for the production of Δ-3,4-thiazolines.

In accordance with this invention Δ-3,4-thiazolines are prepared in a smooth reaction by causing ammonia to act on an equimolar mixture consisting of an α-mercaptoaldehyde or an α-mercaptoketone and a compound containing a keto-group. The reaction is advantageously carried out at room temperature. In performing the reaction it is of no great import whether the mercaptoaldehyde or the mercaptoketone is present in monomeric or polymeric form.

The reaction is carried out in such a manner that 1 mole of an α-mercaptoaldehyde or an α-mercaptoketone and 1 mole of a keto-compound are treated with at least one mole of ammonia. The reaction proceeds under development of heat and separation of water.

The inventive reaction is applied to an α-mercaptoketone proceeds according to the following general formula:

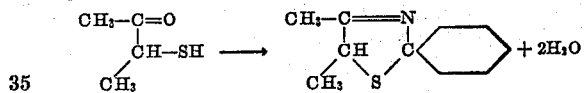

wherein $R_1$, $R_2$ and $R_3$ may stand for alkyl, cycloalkyl, aryl, aralkyl and hydrogen, $R_1$ and $R_2$ are linked in cyclic manner, as for example in α-mercaptocyclohexanone, $R_4$ and $R_5$ may stand for alkyl, cycloalkyl, aralkyl and hydrogen, and $R_5$ may be linked in cyclic manner, as for example in cyclopentanone.

Instead of employing ammonia proper, it is also possible to use ammonium salts in aqueous solution or in another suitable solvent or mixture of solvents.

As α-mercaptoaldehyde or α-mercaptoketones compounds may be used which carry besides the CO— and SH-groups also other suitable substituents of any suitable or desired composition. The same applies for the oxo- or keto-compounds. It will be realized that also differently substituted aldehydes and ketones or also aldoses and ketones may be employed. Both reaction components, i.e. both the α-mercaptoaldehydes or the α-mercaptoketones as well as the aldehydes and ketones may contain unsaturated groups.

The reaction products, i.e. the Δ-3,4-thiazolines obtained by the inventive reaction, that is obtained by the interaction of ammonia or ammonium salts, α-mercaptoaldehydes or α-mercaptoketones and a keto-compound, exhibit considerable physiological action and may thus be used in the synthesis of therapeutic agents. They constitute valuable intermediates and final products for the pharmaceutical industry. Further, they may be used for many other purposes, as, for example, as agents for combatting pests, as preservatives for the preservation of wood, as weed killers and as protecting agents against rust and aging.

The invention will now be described by several examples. It should be understood, however, that these examples are given by way of illustration rather than by way of limitation and that many changes may be made in, for example, quantities, starting materials and process conditions in general, without departing in any way from the spirit and scope of the invention.

*Example 1*

Gaseous ammonia is introduced into a mixture comprising 104 grams of 2-mercaptobutanone-3 and 98 grams of cyclohexanone. The reaction mixture develops heat and water is gradually separated. After completion of the reaction, i.e. when the temperature of the reaction mixture has gone down again to normal temperature, the reaction mixture is taken up in ether and separated from the water. The ether solution is washed with water, dried and thereafter concentrated. The ether residue is fractionated. 155 grams of a 2,2-pentamethylene-4,5-dimethyl-Δ-3,4-thiazoline of a boiling point of 99° C./5 mm. are obtained. The yield corresponds to 80% of the theory. The reaction proceeds according to the following formula:

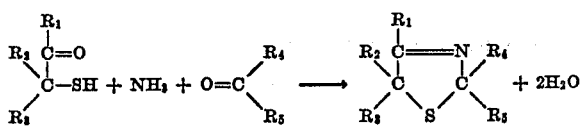

*Example 2*

Gaseous ammonia is introduced into a mixture comprising 118 grams of 2-mercaptopentane-3-one and 98 grams of cyclohexanone. The reaction proceeds in the same manner as has been described in Example 1. After working up, 200 grams of a 2,2-pentamethylene-4-ethyl-5-methyl-Δ-3,4-thiazoline having a boiling point of 114–115° C./6 mm. are obtained. The yield corresponds to 85% of the theory.

*Example 3*

Gaseous ammonia is introduced into a mixture comprising 86 grams of diethylketone and 118 grams of 2-mercaptopentane-3-one. The reaction and the working up after the reaction has been completed proceeds and is carried out respectively as described in Example 1. 155 grams of a 2,2-diethyl-4-ethyl-5-methyl-Δ-3,4-thiazoline of a boiling point of 80° C/4 mm. are obtained. The yield corresponds to 83% of the theory.

*Example 4*

Gaseous ammonia is introduced into a mixture comprising 72 grams of butyraldehyde and 118 grams of 2-mercaptopentane-3-one. The reaction and the subsequent working up proceeds and is carried out respectively as described in Example 1. 137 grams of a 2-n-propyl-4-ethyl-5-methyl-Δ-3,4-thiazoline of a boiling point of 85 to 86° C. at 5 mm. pressure are obtained. The yield corresponds to 80% of the theory.

*Example 5*

Gaseous ammonia is introduced into a mixture comprising 104 grams of 1-mercaptobutane-2-one and 72 grams of methylethylketone. The reaction and subsequent working up proceeds and is carried out respectively in the same manner as has been described in Example 1. 133 grams of a 2-methyl-2,4-diethyl-Δ-3,4-thiazoline of a boiling point of 57 to 60° C. at 6 mm. pressure are obtained. The yield corresponds to 70% of the theory.

*Example 6*

Gaseous ammonia is introduced into a mixture comprising 130 grams of ethylacetoacetate and 118 grams of 2-mercaptopentane-3-one. The mixture develops heat and water is gradually separated. When the reaction is completed, the reaction mixture is taken up in ether. The ether extract is washed and dried. The ether is thereafter evaporated and the residue is distilled through a column in vacuo.

Two fractions are obtained:

(a) Aminocrotonic acid ethylester of a boiling point of 80° C./4.5 mm., and (b) Thiazolinyl ethylacetate of a boiling point of 116° C./4.5 mm.

The yield amounts to 120 grams of thiazolinyl ethyl acetate. This corresponds to 55% of the theory.

*Example 7*

104 grams of 2-mercaptobutane-3-one, 72 grams of butanone, 100 grams of ammonium acetate and 1.5 liters of acetic acid of 10% strength are well stirred at room temperature for about six hours. The reaction mixture thus obtained is then extracted with ether. The ether extract is then washed with diluted sodium hydroxide solution. This is done with a view to removing mercaptobutanone which did not take part in the reaction. The residue is fractionated after evaporation of the ether. 31 grams of 2,4,5-trimethyl-2-ethyl-Δ-3,4-thiazoline, besides small amounts of 2,3,5,6-tetramethyl-2,5-endoxyl-1,4-dithiane and of 2,3,5,6-tetramethyl-2,5-endimino-1,4-dithiane are obtained. The yield is thus about 50%. The boiling point was 78° C./15 mm.

*Example 8*

Gaseous ammonia is introduced at a temperature of about 15–25° C. into a mixture comprising 76 grams of mercaptoacetaldehyde (in the form of its dimer) and 100 grams of acetoone. Subsequent to the dissolution of the dimer mercaptoacetaldehyde, the working up of the reaction mixture is performed in accordance with the procedure described in Example 1. 113 grams of 2,2-dimethyl-thiazoline-Δ-3,4 having a boiling point of 49° C./18 mm. are obtained. This corresponds to a yield of 75% of the theory. The reaction proceeds according to the following formula:

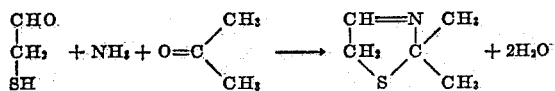

*Example 9*

A mixture comprising 90 grams of mercaptoacetone (in the form of its dimer), 60 grams of acetone, 120 grams of ammoniumcarbonate and 100 cubic centimeters of methanol is heated to 50° C. for one hour. The reaction mixture is then cooled whereafter it is taken up with ether. The ethereal solution is repeatedly washed with water, whereafter it is dried. The ether is then expelled and the residue is fractionated. 103 grams of 2,2,4-trimethyl-thiazoline-Δ-3,4 having a boiling point of 56° C./12 mm. are obtained. The yield corresponds to 80% of the theory.

*Example 10*

198 grams of dextrose are suspended in 350 cubic centimeters of concentrated ammonia water. Gaseous ammonia is introduced into the slurry thus obtained under simultaneous heating to 50° C. 180 grams of α-mercapto-di-n-propylketone are added to the slurry dropwise in the course of about one hour. After completed addition, the reaction mixture is further stirred for two hours at a temperature of 50° C. and under introduction of ammonia. The cooled reaction mixture is then extracted with ether and the aqueous solution soon starts crystallizing. After the crystal mass has been sucked off, further quantities of crystal fractions may be obtained from the mother liquor by concentrating and cooling the latter. After the recrystallization from acetic ester, 178 grams of a thiazoline having a melting point of 129–130° C. are obtained. The constitution of the thiazoline becomes apparent from the following formula illustrating the course of the reaction:

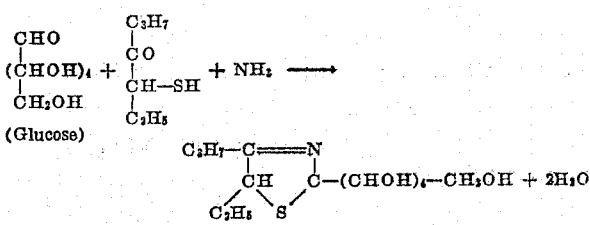

*Example 11*

90 grams of α-mercaptopropionicaldehyde are mixed with 72 grams of n-butyric aldehyde. The mixture thus obtained is subsequently treated with ammonia. The working up of the reaction mixture is carried out in accordance with the procedure described in Example 1. 123 grams of 2-n-propyl-5-methylthiazoline-Δ-3,4 are obtained. This yield corresponds to 86% of the theory. The reaction proceeds in accordance with the following formula:

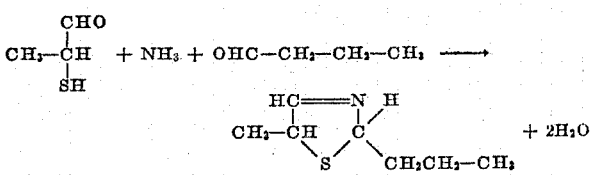

What we claim is:

1. A process for the production of thiazolines comprising the steps of simultaneously reacting ammonia with a mercaptoketone of formula

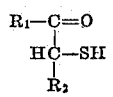

and a cyclic ketone of formula

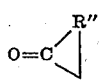

and recovering the thiazoline wherein $R_1$ and $R_2$ are alkyl radicals and $R''$ is a divalent alkylene radical.

2. A process for the production of thiazolines comprising the steps of simultaneously reacting ammonia with a mercaptoketone of formula

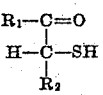

and an aldehyde of formula

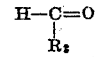

and recovering the thiazoline, wherein $R_1$, $R_2$ and $R_3$ are alkyl radicals.

3. A process for the production of thiazolines comprising the steps of simultaneously reacting ammonia with a mercaptoketone of formula

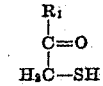

and a ketone of formula

and recovering the thiazoline, wherein $R_1$, $R_2$ and $R_3$ are alkyl radicals.

4. A process for the production of thiazolines comprising the steps of simultaneously reacting ammonia with a mercapto ketone of formula

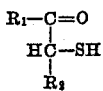

and a ketone of formula

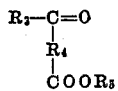

and recovering the thiazoline, wherein $R_1$, $R_2$, $R_3$ and $R_5$ are alkyl groups and $R_4$ is a divalent alkylene radical.

5. A process for the production of thiazolines comprising the steps of simultaneously reacting ammonia with a mercaptoketone of formula

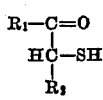

and an aldose, and recovering the thiazoline, wherein $R_1$ and $R_2$ are alkyl groups.

6. A process for the production of 2,2-pentamethylene-4,5-dimethyl-Δ-3,4-thiazoline, comprising the steps of introducing gaseous ammonia into a mixture comprising 2-mercaptobutanone-3 and cyclohexanone, and separating the product formed.

7. A process for the production of 2,2-pentamethylene-4-ethyl-5-methyl-Δ-3,4-thiazoline, comprising the steps of introducing gaseous ammonia into a mixture of 2-mercaptopentane-3-one and cyclohexanone, and separating the product formed.

8. A process for the production of 2-n-propyl-4-ethyl-5-methyl-Δ-3,4-thiazoline, comprising the steps of introducing gaseous ammonia into a mixture of butyraldehyde and 2-mercaptopentane-3-one, and separating the product formed.

9. A process for the production of 2-methyl-2,4-diethyl-Δ-3,4-thiazoline, comprising the steps of introducing gaseous ammonia into a mixture of 1-mercaptobutane-2-one and methylketone, and separating the product thus formed.

10. A process for the production of thiazolinyl ethylacetate, comprising the steps of introducing gaseous ammonia into a mixture of ethylacetoacetate and 2-mercaptopentane-3-one, extracting the reaction mixture, and distilling the extract to a temperature of about 116° C. at about 4.5 millimeters of pressure.

11. A process for the production of a thiazoline of the formula

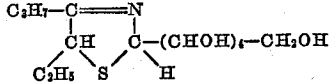

comprising the steps of reacting dextrose, concentrated ammonia water, gaseous ammonia and α-mercapto-di-n-propylketone, and separating the product thus formed.

No references cited.